United States Patent
Barral et al.

(10) Patent No.: US 9,729,226 B2
(45) Date of Patent: Aug. 8, 2017

(54) COMMUNICATION SYSTEM FOR AN AIRCRAFT WITH AN EXTERNAL ASSEMBLY AND RELATED METHOD

(71) Applicant: DASSAULT AVIATION, Paris (FR)

(72) Inventors: Jérôme Barral, Paris (FR); Eric Boulle, Mouries (FR); Hervé Laverne, Le Taillan Medoc (FR)

(73) Assignee: DASSAULT AVIATION, Paris (FR)

( * ) Notice: Subject to any disclaimer, the term of this patent is extended or adjusted under 35 U.S.C. 154(b) by 0 days.

(21) Appl. No.: 14/729,818

(22) Filed: Jun. 3, 2015

(65) Prior Publication Data

US 2015/0365161 A1   Dec. 17, 2015

(30) Foreign Application Priority Data

Jun. 12, 2014  (FR) ..................... 14 01336

(51) Int. Cl.
| | |
|---|---|
| *H04B 7/26* | (2006.01) |
| *H04W 4/14* | (2009.01) |
| *G08G 5/00* | (2006.01) |

(52) U.S. Cl.
CPC ............ *H04B 7/26* (2013.01); *G08G 5/0013* (2013.01); *G08G 5/0021* (2013.01); *H04W 4/14* (2013.01); *G08G 5/0039* (2013.01)

(58) Field of Classification Search
CPC ......... H04W 4/14; H04B 7/26; G08G 5/0013; G08G 5/0021; G08G 5/0039
See application file for complete search history.

(56) References Cited

U.S. PATENT DOCUMENTS

| 8,164,487 B1 | 4/2012 | Tsai | |
|---|---|---|---|
| 8,497,784 B1* | 7/2013 | Vandrovec | B64D 43/00 340/945 |
| 2003/0006910 A1 | 1/2003 | Dame | |
| 2008/0163093 A1 | 7/2008 | Lorido | |
| 2011/0291861 A1 | 12/2011 | Meunier et al. | |
| 2013/0033387 A1 | 2/2013 | Trope | |
| 2013/0066487 A1* | 3/2013 | Holder | G08G 5/0021 701/14 |
| 2013/0141254 A1 | 6/2013 | McGuffin et al. | |
| 2015/0081138 A1* | 3/2015 | Lacko | B64D 45/00 701/3 |

FOREIGN PATENT DOCUMENTS

FR          2 907 999 A1    5/2008

* cited by examiner

*Primary Examiner* — Joseph Dean, Jr.
(74) *Attorney, Agent, or Firm* — Davidson, Davidson & Kappel, LLC

(57) ABSTRACT

A communication system for an aircraft with an external assembly and related method are provided. The system includes a unit for receiving incoming text messages, received from the outside assembly, and sending outgoing text messages, sent to the outside assembly; a display screen and a display management station, the display management station being able to display, on the display screen, a synthesis window showing a series of incoming text messages and/or outgoing text messages, each text message containing operating information about the aircraft. The display management station is able to display, in the synthesis window, an execution status indicator for an action to be performed remaining to be executed, associated with the incoming text message and/or the outgoing text message, in addition to the operating information of the aircraft.

19 Claims, 5 Drawing Sheets

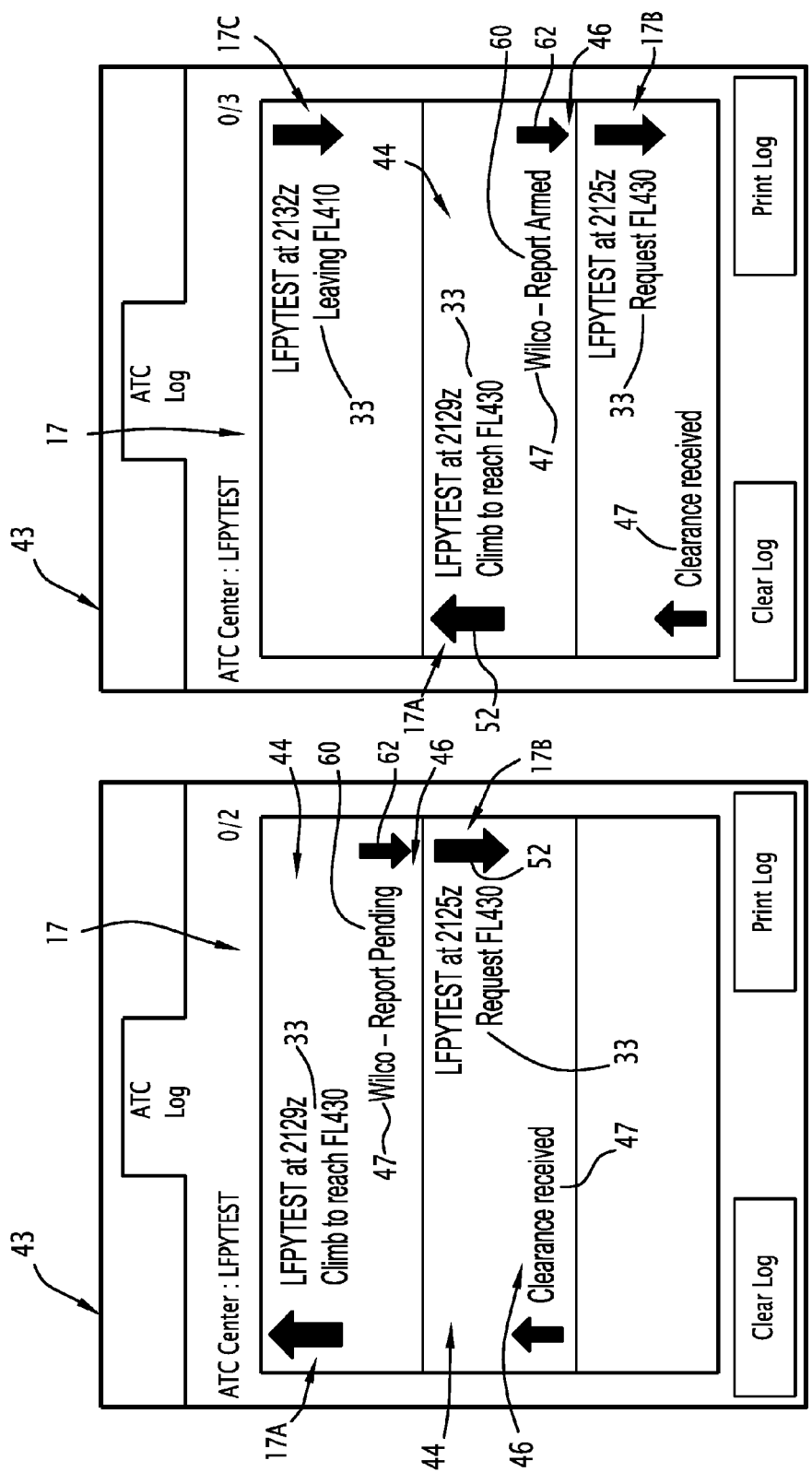

COMMUNICATION SYSTEM FOR AN AIRCRAFT WITH AN EXTERNAL ASSEMBLY AND RELATED METHOD

This claims the benefit of French Patent Application FR 14 01336, filed Jun. 12, 2014 and hereby incorporated by reference herein.

The present invention relates to a communication system for an aircraft to communicate with an outside assembly, comprising:
- a unit for receiving incoming text messages, received from the outside assembly, and sending outgoing text messages, sent to the outside assembly;
- a display screen and a display management station, the display management station being able to display, on the display screen, a synthesis window showing a series of incoming text messages and/or outgoing text messages, each text message containing operating information about the aircraft.

Such a communication system is designed to be placed in the cockpit of an aircraft so as to allow the crew to communicate with the outside assembly, for example an air traffic control center.

BACKGROUND

In a known manner, aircraft cockpits are equipped with communication systems using text messages, commonly referred to as "Controller to Pilot DataLink Communication" systems or CPDLC. Such a communication system is used to supplement or replace traditional voice communication means used between the aircraft and an outside assembly.

This type of communication system in particular comprises a user interface made up of a screen for displaying incoming and outgoing text messages, and buttons making it possible to display more details about the contents of a text message on the screen.

The text messages are displayed on the screen of the communication system while being placed one after the other, in chronological transmission/reception order.

The text messages are frequently used to send operating information of the aircraft, such as requests for altitude or heading changes by the aircraft or authorizations given by the control center to make that change.

Furthermore, some incoming messages are transmitted while being accompanied by actions to be performed following from the evolution instructions emitted by the outside assembly, and having to be carried out by the crew of the aircraft.

An action to be performed is for example sending a performance report indicating that a heading or altitude has been left and/or sending an execution report indicating that a heading or altitude has been reached.

Such actions to be performed benefit from an execution status determined based on the nature of the action to be performed, for example "report remaining to be transmitted manually", "report that will be transmitted automatically", and which may evolve over time, in particular when the action to be performed has ultimately been executed.

The crew of the aircraft must precisely and unambiguously know what the execution status associated with an action to be performed is at all times, so as to ensure that the actions to be performed are being performed correctly. Knowing the execution status of an action to be performed contributes to the crew having an accurate overall awareness of the chain of actions to be performed.

To that end, the execution statuses associated with an action to be performed are automatically determined by the text message reception and transmission unit. These statuses are sometimes displayed in a secondary window specific to each text message, which can be activated from the synthesis window using the selection buttons of the man/machine interface.

SUMMARY OF THE INVENTION

Such a communication system is not fully satisfactory. In fact, the crew of the aircraft must use selection buttons to navigate in the windows of different messages in order to learn the execution status of each action to be performed, which may create task management difficulties for the crew.

One aim of the invention is to provide a communication system facilitating the overall awareness of information and task management by the crew.

To that end, a communication system of the aforementioned type is provided, characterized in that the display management station is able to display, in the synthesis window, for at least one incoming text message and/or outgoing text message displayed in the synthesis window, an execution status indicator for an action to be performed remaining to be executed, associated with the incoming text message and/or the outgoing text message, in addition to the operating information of the aircraft.

The communication system according to the invention may comprise one or more of the following features, considered alone or according to any technically possible combination:
- the reception and sending unit includes a module for processing incoming text messages, able to extract, from an incoming text message, an action to be performed associated with the incoming text message, and a module for determining the execution status of the action to be performed associated with the incoming text message.
- the display management station is able to display, at the synthesis window, a secondary window specifying the or each action to be performed, the secondary window advantageously having a button to close the secondary window, allowing a return to the synthesis window.
- the action to be performed includes sending, to an outside assembly, an execution report for an operation associated with the message.
- the action to be performed is chosen from among the manual sending to the outside assembly of an execution report for the operation associated with the message, or the automatic sending to the outside assembly of an execution report for the operation associated with the message.
- the execution status is chosen from among pending the manual sending of an execution report, pending the automatic sending of an execution report, pending the action to be performed, or expiration of the action to be performed after a predefined time delay.
- the execution status indicator includes text displayed in the incoming message and/or the outgoing message.
- the display management station is able to display an auxiliary indicator, situated near the performance status indicator, specifying the incoming or outgoing nature of the action to be performed.
- the display management station is able to display the execution status indicator with distinct marking of the operation information of the text message.

The invention also provides a communication method for an aircraft to communicate with an outside assembly, comprising the following steps:

provinding a communication system as defined above;
using the display management station to display, on the display screen, a synthesis window showing a series of incoming text messages and/or outgoing text messages, each text message containing operating information of the aircraft,
displaying, in the synthesis window for at least one incoming text message and/or one outgoing text message displayed in the synthesis window, an execution status indicator for an action to be performed remaining to be executed associated with the incoming message and/or the outgoing message, in addition to the operating information of the aircraft.

The method according to the invention may comprise one or more of the following features, considered alone or according to any technically possible combinations:

displaying, in the synthesis window, an outgoing message sent by the aircraft to the outside assembly, the outgoing message being related to a request from the aircraft to the outside assembly to perform an operation;
displaying an incoming message received by the aircraft in response to the request from the aircraft, the incoming message being associated with at least one action to be performed associated with the operation;
displaying, in the synthesis window, an execution status indicator for the action to be performed remaining to be executed associated with the incoming message.
the outgoing message relates to a request to change the evolution of the aircraft, the incoming message including an authorization to make the evolution change.
the action to be performed includes sending the outside assembly an execution report,
the method including the manual or automatic sending of the execution report from the aircraft to the outside assembly when the action to be performed is completed and deactivating the display of the execution status indicator in the synthesis window after the execution report has been sent.
it comprises a step for opening a secondary window on the display screen outlining the or each action to be performed associated with the incoming message and/or the outgoing message, then closing the secondary window to return to the synthesis window, the execution status indicator being displayed in the synthesis window.
it comprises receiving an incoming text message by an incoming text message reception unit and processing the incoming text message to extract at least one action to be performed therefrom associated with the incoming text message, the method including a step for determining the execution status of the action to be performed by a status determination module of the reception unit.

BRIEF SUMMARY OF THE DRAWINGS

The invention will be better understood upon reading the following description, provided solely as an example and done in reference to the appended drawings, in which:

FIG. 5 is a view similar to FIG. 3, in which a first type of execution status indicator for an action to be performed is displayed;

FIG. 6 is a view similar to FIG. 3, in which a second type of execution status indicator for an action to be performed is displayed;

DETAILED DESCRIPTION

Figure 2:
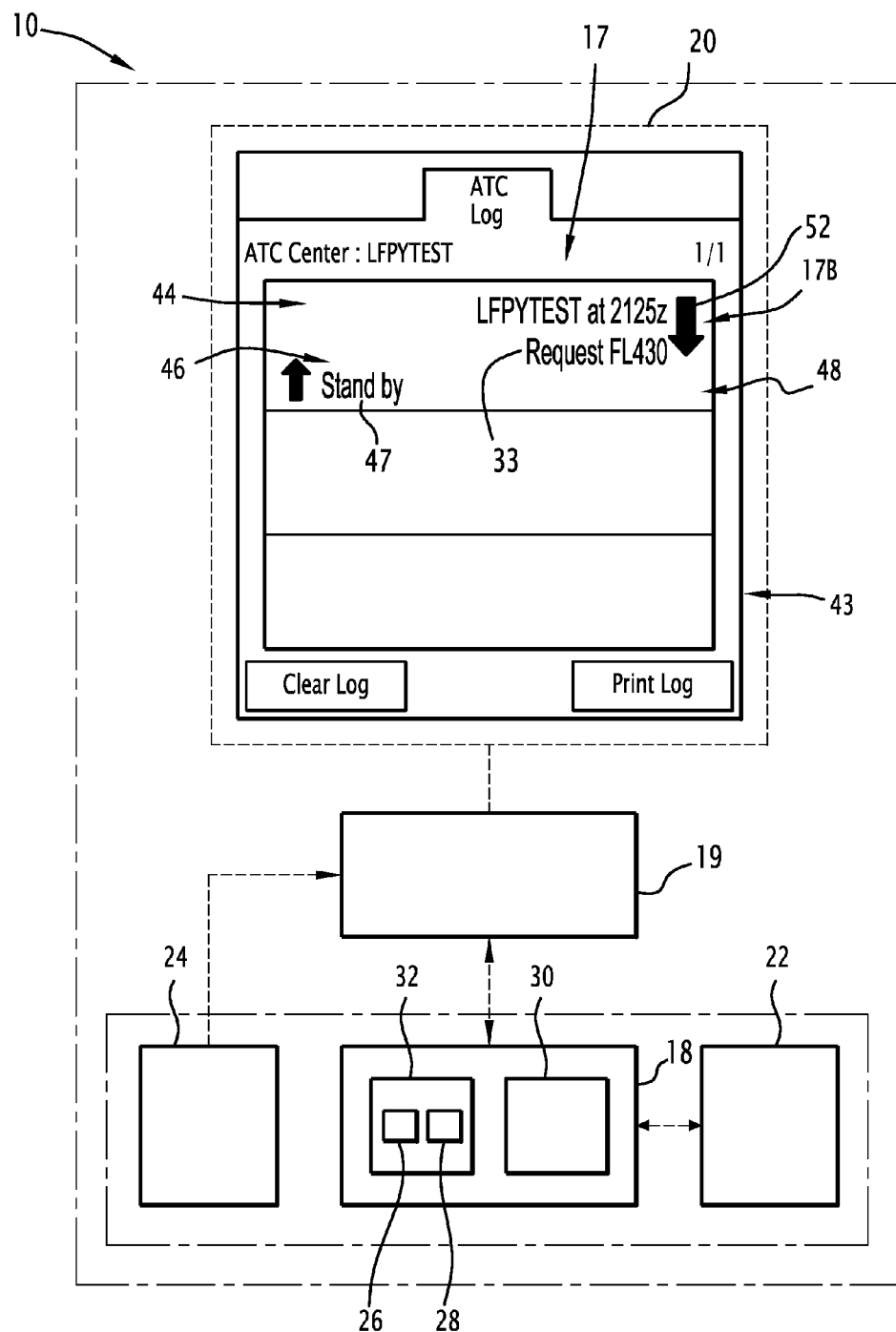
FIG. 2 is a diagrammatic view of the communication system according to the invention positioned in the aircraft.

A first communication system 10 according to the invention is illustrated by FIG. 2.

Figure 1:
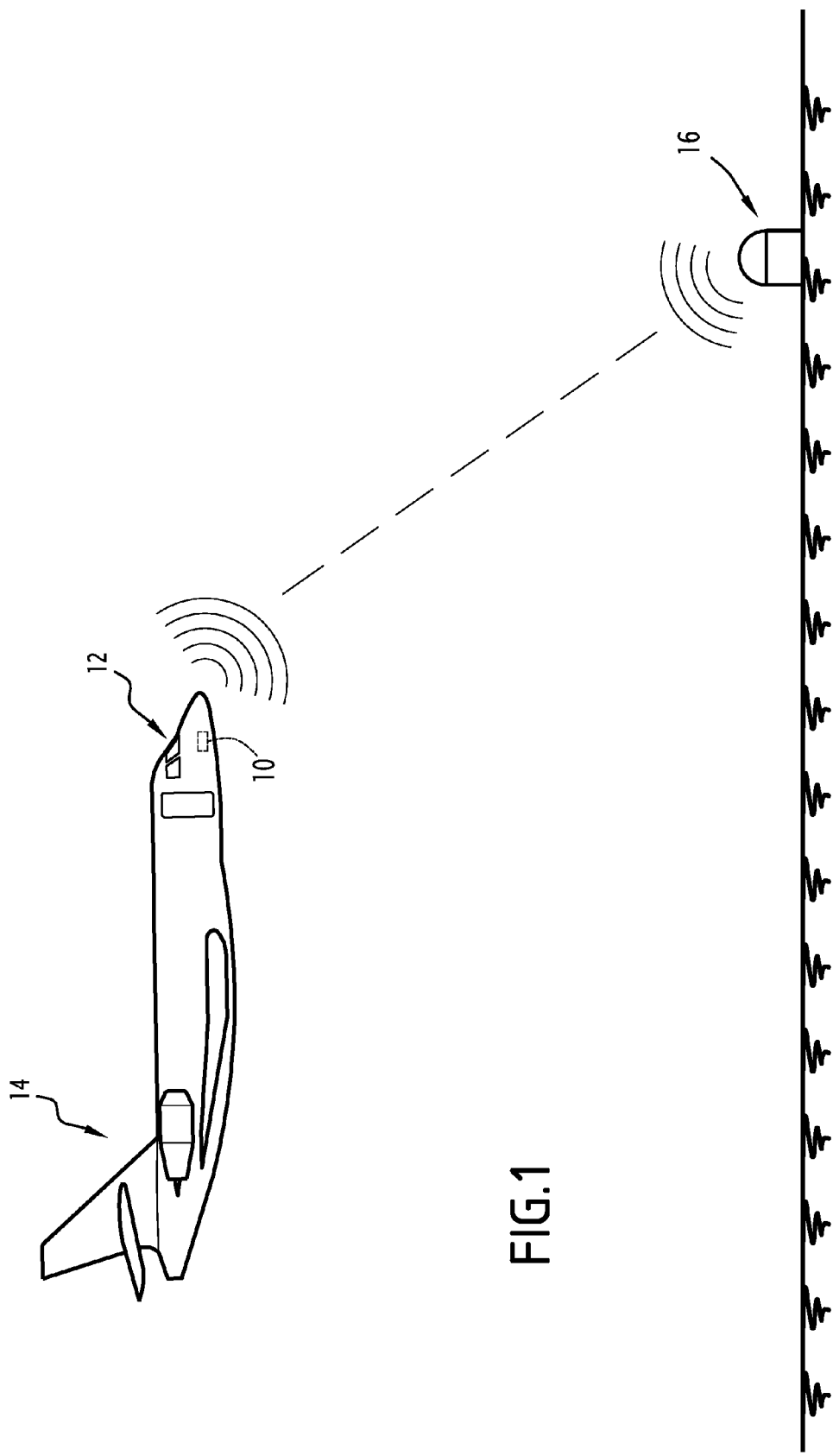
FIG. 1 is a diagrammatic view of an aircraft in communication with an outside assembly, the aircraft being provided with a first communication system according to the invention.

As shown in FIGS. 1 and 2, the communication system 10 is designed to be placed in the cockpit 12 of the aircraft 14, so as to allow the crew of the aircraft 14 to exchange information with an outside assembly 16, by means of text messages 17, in particular to manage navigation.

The outside assembly 16 is for example an air traffic control center, such as a control tower of an airport or an aircraft carrier, or an approach control center.

The text messages 17 contain operating information of the aircraft 14, such as evolution operations of the aircraft, for example changes in altitude or heading of the aircraft.

In the outgoing messages 17B, 17C, 17D sent from the aircraft 14 to an outside assembly 16, the operating information for example comprises evolution change requests sent by the crew of the aircraft 14 to the outside assembly 16, such as requests to change altitude or heading, evolution change confirmations, such as confirmations of the change of a heading or altitude, or confirmations for the arrival at a target heading or altitude.

In the incoming text messages 17A, the operating information comprises evolution change instructions sent by the outside assembly 16 to the crew of the aircraft 14, such as instructions or evolution change authorizations for the aircraft 14, in particular for a heading or altitude, or standbys.

In some cases, the text message 17A bears at least one action to be performed associated with the message 17, advantageously associated with the operating information of the aircraft 14 transmitted by the message 17A, in addition to the operating information.

The action to be performed is for example the sending of a report, in particular the manual or automatic sending of an execution report for an operation.

Advantageously, as specified above, the operation is an evolution of the aircraft 14, such as an evolution change of the aircraft 14, in particular a change in heading or altitude.

The execution report in particular relates to the beginning of an evolution of the aircraft 14, such as leaving a heading or altitude, passing through a given intermediate point of the evolution, such as a defined heading or defined altitude, or the arrival at a target evolution, such as a target heading or a target altitude.

In that case, the action to be performed comprises the manual or automatic sending of an execution report as defined above by the aircraft 14 to the outside assembly 16.

When the operating information includes an evolution instruction, the action to be performed is to be executed in addition to the evolution instruction.

As long as they have not been executed, the actions to be performed 35 have an execution status such as for example pending manual sending of an execution report, pending automatic sending of an execution report, pending the action to be performed 35, or expiration of the action be performed 35 after a predefined time delay.

In reference to FIG. 2, the communication system 10 comprises a unit 18 for receiving incoming text messages 17 and sending outgoing text messages 17, a display management station 19, and a display screen 20, partially shown in FIG. 2, the display screen 20 being connected to the display management station 19.

The communication system 10 further includes an outside transmission assembly 22 connected to the unit 18 and a man/machine interface 24 connected to the display management station 19.

The outside transmission assembly 22 for example includes data transmission units between the aircraft 14 and the outside assembly 16, and a signal processing unit.

The transmission units are for example radio and/or satellite transmission units. They are able to send and receive a signal carrying a text message 17 between the aircraft 14 and the outside assembly 16.

The signal processing unit is able to convert a transmission signal bearing a text message 17 received by the aircraft 14 into a signal sent to the transmission and reception unit 18, and vice versa.

The man/machine interface 24 is designed to allow the crew of the aircraft 14 to interact with the communication system 10 according to the invention. According to one embodiment, the man/machine interface 24 comprises a member for controlling a cursor displayed on the display screen 20 to activate selected zones of the display screen 20 such as buttons, and an alphanumeric keypad designed in particular to enter instructions or information to be included in a text message 17.

The unit 18 includes at least one processor 30 and at least one memory 32 containing a software processing module 26 for processing text messages 17 and a software module 28 for determining the execution status of each action to be performed 35 optionally associated with a text message 17.

The modules 26 and 28 are able to be executed by the processor 30.

The memory 32 is further able to keep and archive the incoming and outgoing text messages 17, such that those messages remain accessible to the crew of the aircraft 14.

The processing module 26 for the text messages 17 is able to extract the operating information from a text message and, if applicable, determine the actions to be performed 35 associated with the message.

The determination module 28 is able to receive, from the processing module 26, the type of action to be performed 35, and to determine the execution status associated with each action from among the execution statuses defined above.

The unit 18 is connected to the display management station 19 to which the operating information contained in the text messages 17, the actions to be performed 35 resulting from those messages, and the execution statuses relative to each of the actions remaining to be executed are sent.

Advantageously, the display screen 20 is a multifunctional screen such as a primary display screen designed to display flight parameters, and/or a multifunctional navigation and/or monitoring and control screen for the avionic systems. This display screen 20, only the relevant region of which is shown in FIG. 2, is for example produced using liquid crystal display technology.

The display management station 19 is able to display, on the display screen 20, a synthesis window 43 showing a series of incoming and/or outgoing text messages 17 appearing in chronological transmission/reception order, for example from bottom to top.

Figure 3:
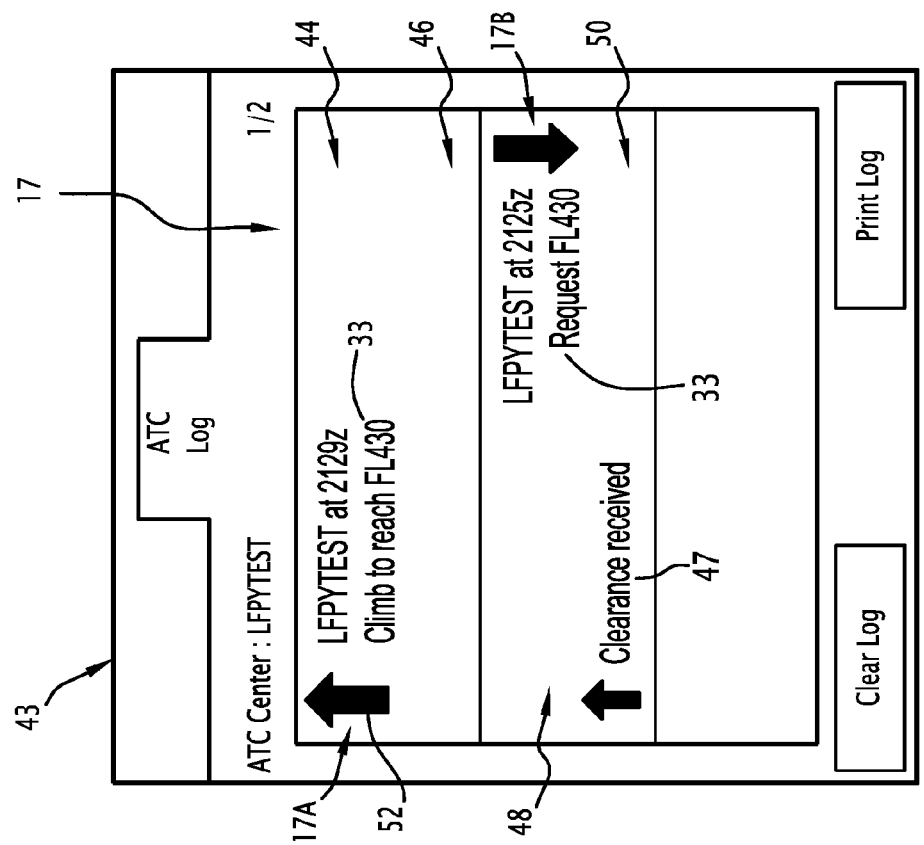
FIG. 3 is a view of the display screen of the communication system according to the invention, on which a synthesis window is displayed for the incoming and/or outgoing text messages.

As shown in FIG. 3, the display management station 19 is able to delimit, in each text message 17, a first text zone 44 and optionally a second text zone 46. In this example, the text zone 44 is positioned above the text zone 46.

The display management unit 19 is able to display, in each first text zone 44, a piece of operating information 33 of the aircraft 14 transmitted by the crew of the aircraft 14, in this case an outgoing message 17B, 17C, 17D, or by an outside assembly 16 in the case of an incoming message 17A.

Advantageously, the display management station 19 is able to display, in each second text zone 46, response information 47 to the operating information 33 of the aircraft 14, which, depending on the case, comes from the aircraft 14 or the outside assembly 16.

As shown in FIGS. 5 and 6, the response information 47 is for example information authorizing the execution of an evolution operation of the aircraft 14, that information being received from the outside assembly 16, or acceptance information for an evolution instruction sent by the aircraft 14.

The display management station 19 is also able to delimit, in each text zone 44, 46 of a text message 17, a first part 48 (here on the left) and a second part 50 (here on the right) making it possible to identify the incoming or outgoing nature of a text message 17.

In this example, the display management station 19 is able to display, in each text zone 44, 46, identification information in the form of an icon 52. In particular, the icon 52 is an arrow pointing upward or downward, to respectively identify the incoming or outgoing nature of a text message 17.

According to one embodiment, each text message 17A received by the aircraft 14 is positioned in the left part 48 of the message, and conversely, each text message 17B, 17C, 17D sent by the aircraft is positioned in the right part 50.

Figure 4:
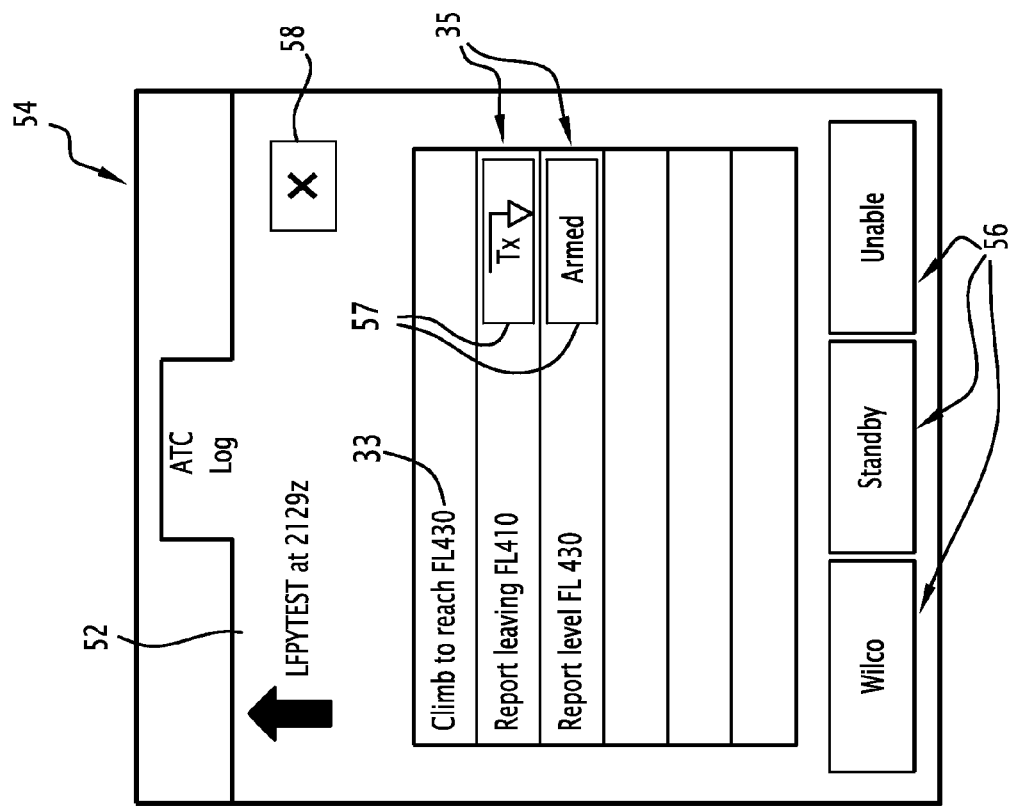
FIG. 4 is a view of the display screen of the communication system according to the invention, on which a secondary window associated with a text message is displayed.

The display management station 19 is able to display, for example by action by the crew using the man/machine interface 24, the detailed content of a text message 17, as illustrated in FIG. 4.

To that end, the display management station 19 is able to display, on the screen 20, a secondary window 54 replacing the synthesis window 43, the secondary window 54 containing the details of a text message 17. The operating information 33 is listed in this secondary window 54, as well as the action(s) to be performed 35 associated with the text message 17.

Furthermore, the display management station 19 is able to display, in the secondary window 54, at least one response button 56 making it possible to respond to a text message 17.

For example, the crew of the aircraft 14 is able to respond favorably to the request from a text message 17 by using a first "Wilco" button, to place the request of a text message 17 in standby by using a second "Standby" button, or to respond unfavorably to the request of a text message 17 by using a third "Unable" button.

Furthermore, for each action to be performed 35, the display management station 19 is advantageously able to display an activation/deactivation button 57 for the action to be performed.

The display management station 19 is able to display, in the secondary window 54, at least one button 58 to close the secondary window 54 allowing the crew to return to the display of the synthesis window 43 on the display screen 20.

According to the invention, as illustrated in FIGS. 5 and 6, the display management station 19 is able to display, in the synthesis window 43, an indicator of an execution status 60 of at least one action to be performed 35 not yet executed associated with a text message 17.

The indicator for the execution status 60 can be displayed in the corresponding text message 17, to be directly visible in the synthesis window 43, without any obligation to go to a secondary window 54.

The execution status indicator 60 is obtained from the execution status determined by the determination module 28.

Advantageously, the execution status indicator 60 is positioned in the second text zone 46 of a text message 17.

Here, the execution status indicator 60 is text. It has a distinctive marking from the other elements displayed on the display screen 20.

According to one embodiment, the marking of the execution status indicator 60 has a color exclusively reserved for it, different from that in which the operating information is displayed.

The display management station 19 is also able to display an icon 62 near the indicator of the execution status 60 in the text message 17, able to specify the incoming or outgoing nature of the action to be performed 35.

In one embodiment, such an icon 62 is positioned on the same text line as the execution status indicator 60.

In the case of an action to be performed 35 by the crew of the aircraft 14, the icon 62 here assumes the form of an arrow pointing downward to specify again that the action to be performed 35 is to be executed by the crew of the aircraft 14.

The icon 62 has the same distinctive marking as that used for the representation of the execution status indicator 60.

Because the execution status can evolve as long as the corresponding action to be performed 35 has not been executed, the display management station 19 is able to replace a first execution status indicator 60 with a second execution status indicator 60, once the evolution of the execution status is detected by the determination module 28.

Figure 7:
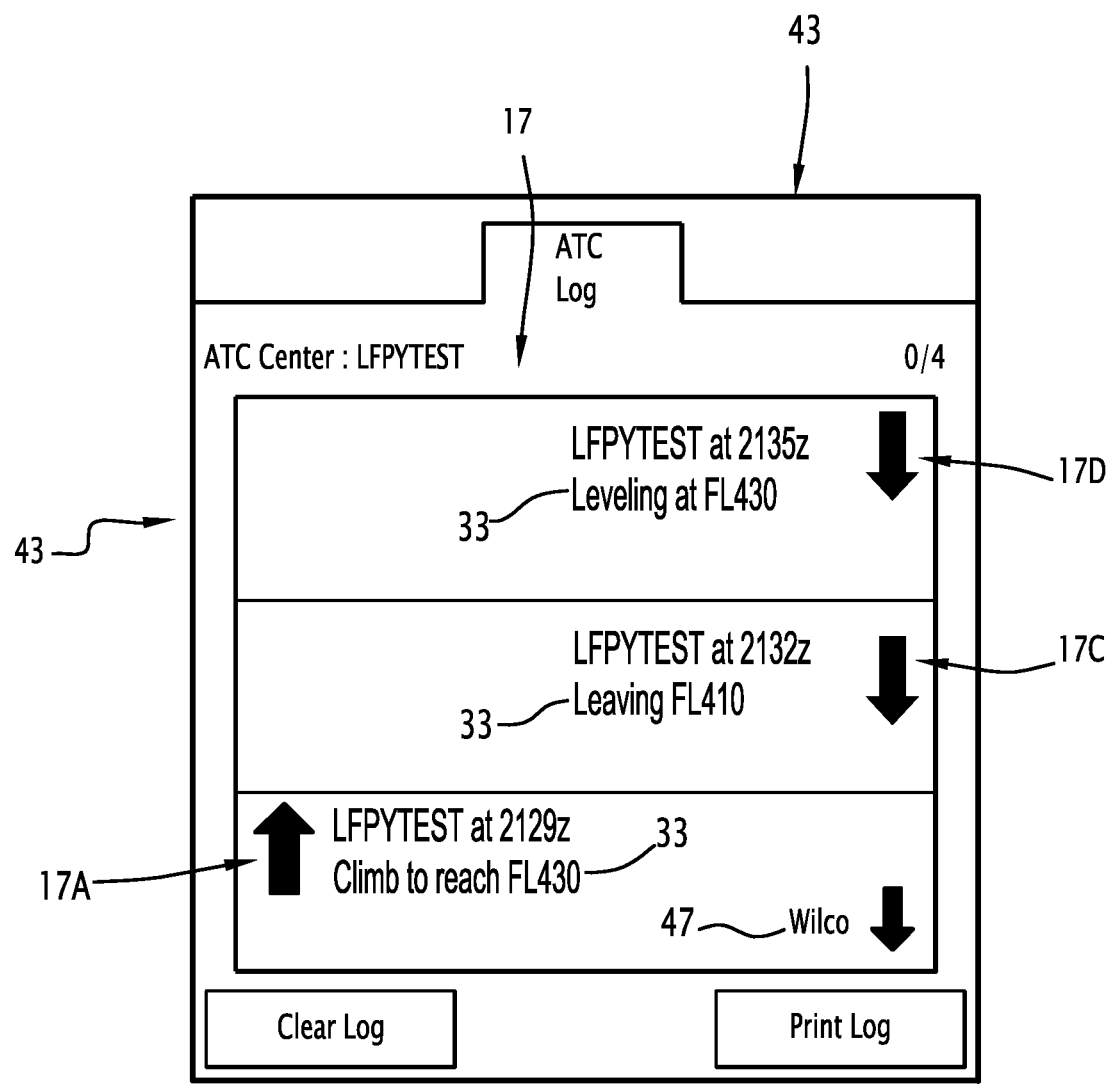
FIG. 7 is a view similar to FIG. 3, illustrating a synthesis window after execution of the actions to be performed.

Lastly, and as illustrated in FIG. 7, when an action to be performed 35 is executed, the display management station 19 is able to replace, in the text message 17, the indicator for the execution status 60 with response information 47, as defined above.

A communication method between an aircraft 14 and an outside assembly 16 implemented using the communication system 10 according to the invention will now be described.

This method is for example described in the context of an evolution operation of the aircraft 14, in particular change of heading or, in the case at hand, a change of altitude of the aircraft.

Initially, in reference to FIG. 2, the crew of the aircraft 14 wishes to perform an evolution operation, for example here a change of altitude.

Using the man/machine interface 24, it composes an outgoing text message 17B indicating a piece of operating information 33, here a desired evolution request, to change altitude. The text message 17B is sent from the unit 18 of the aircraft 14 to the outside assembly 16 by means of the outside transmission assembly 22.

The display management station 19 displays the operating information 33 in the first text zone 44 in the form of a text (here "Request FL430"). The display station 19 also displays an icon 52 illustrating the outgoing nature of that message 17B, here an arrow pointing downward.

Then, the crew waits for the response from the outside assembly 16. In this example, a first standby response is then sent by the outside assembly 16 to the aircraft 14. A piece of response information 47 indicating the placement in standby mode is displayed in the second text zone 46 (here "Standby").

When the outside assembly 16 grants the evolution authorization, it sends a text message 17A. This incoming text message 17A includes a piece of operating information 33 and is associated with at least one action to be performed 35. The message 17A is received by the transmission assembly 22 and is transmitted to the unit 18.

In this example, the operating information 33 is an evolution instruction, i.e., here an instruction to climb to a target altitude threshold.

The processing module 26 analyzes the received incoming message 17A and extracts the operating information 33 contained in that message 17A therefrom. The display management station 19 displays the text message 17A containing the operating information 33 (here "Climb to FL 340") in the first text zone 44.

The display management station 19 updates the text message 17B by displaying, in the second zone 46 of that message 17B, response information 47 to that message, namely "clearance received".

The display management unit 19 further displays an icon 62 indicating the incoming nature of the response information, here an arrow pointing upward.

The processing module 26 determines the actions to be performed 35 associated with the operating information 33 of the message 17A.

In reference to FIG. 4, two actions to be performed 35 here are associated with the text message 17A, i.e., the sending of a manual report when the aircraft 14 leaves its current level and the sending of an automatic report when the aircraft reaches the target altitude threshold.

On this basis, the display management station 19 displays, in the secondary window 54, the operating information 33 and the list of actions to be performed 35 ("Report leaving FL 410" and "Report level FL 430"), and response buttons 56.

The station also displays the activation/deactivation buttons 57 for the actions to be performed.

In this example, the button 57 associated with the sending of a manual report can be activated to cause the display of a pre-completed window to send an outgoing text message. The button 57 associated with the sending of an automatic report can be selected to activate or deactivate the automatic sending of the report.

The crew provides its agreement on the operating information 33 and confirms the actions to be performed 35 by activating the response button 56 ("Wilco").

Advantageously, the secondary window 54 then closes automatically. In reference to FIG. 5, in the synthesis window 43, the message 17A is displayed above the message 17B.

The display management station 19 displays, in the second zone 46 of the message 17B, a piece of response information 47 to the message 17A, i.e., the acceptance by the crew of the aircraft 14 ("Wilco").

According to the invention, the display management station 19 also displays an indicator 60 of the execution status of an action to be performed 35 remaining to be executed associated with the incoming message 17A. This indicator 60 here is a text recalling that a report must be set manually ("Report pending").

The indicator 60 is preferably displayed with a particular marking, for example a specific color, to allow it to be identified quickly by the crew.

Thus, the synthesis window 43 explicitly displays all of the operating information 33 present in the text messages 17, as well as the execution status indicator 60 recalling that specific actions remain to be performed.

The crew of the aircraft 14 does not need to navigate in secondary windows 54 to have this indicator 60. This makes their task easier and makes control easier as well, which therefore leads to better awareness by the crew of the operational situation.

Next, in reference to FIG. 6, when the aircraft 14 begins to execute the evolution operation, the crew sends a manual execution report in the form of a third text message 17C, which is displayed above the message 17A in the synthesis window 43.

The processing module 26 determines that the manual execution report has been sent and that the automatic report must henceforth be sent when the aircraft 14 has completed execution of the evolution operation 33, here reaching the target altitude threshold.

The determination module 28 determines a new execution status for the action to be performed 35. On that basis, the display management station 19 displays, in the second text zone 44, a new indicator 60 of the action to be performed 35 remaining to be executed associated with the incoming message 17A.

This indicator 60 here is text recalling that the report must be sent automatically and that the sending of that report has been armed ("Report armed").

The determination module 28 updates the execution status, at least when a modification of that status is made. For example, if the crew deactivates the automatic sending of the execution report using the button 57 in the window 54 shown in FIG. 4, the execution status goes to "Report pending", and the indicator 60 is updated.

Then, in reference to FIG. 7, when the aircraft 14 has completed the evolution operation associated with the message 17A, the automatic execution report is sent in the form of a new outgoing text message 17D that is displayed above the message 17C.

The text message 17D includes the operating information 33 according to which the target flight level has been reached ("Leveling at FL 430").

The processing module 26 analyzes that the automatic execution report has been sent and that no other action to be executed 35 associated with the message 17A remains to be performed.

As a result, the determination module 28 commands the deactivation of the display of the indicator of the execution status 60 of the message 17A in the synthesis window 43. The second zone 46 of the message 17A then contains only the response information 47 to the message 17B (here "Wilco").

Alternatively, the method according to the invention is implemented when the aircraft is on the ground, for example during taxiing phases from or to a landing or takeoff runway or when departure or ocean crossing clearance request phases occur.

In that case, the operating information is for example the departure, taxi or ocean crossing clearances.

In another alternative, the outside assembly 19 is another moving platform, for example an aircraft.

In an alternative (not shown), the display management station 19 can display other types of data on the display screen 20, such as weather information, the state of air traffic, etc.

What is claimed is:

1. A communication system for an aircraft to communicate with an outside assembly comprising:
a receiver/sender configured to receive incoming text messages, received from the outside assembly, and to send outgoing text messages, sent to the outside assembly, the outside assembly being an air traffic control center or an approach control center;
a display screen and a display manager, the display manager configured to display, on the display screen, a synthesis window showing a series of incoming text messages and/or outgoing text messages, each text message containing operating information about the aircraft,
the display manager being configured to display, in the synthesis window, for at least one incoming text message and/or outgoing text message displayed in the synthesis window, an execution status indicator for an action to be performed remaining to be executed, associated with the incoming text message and/or the outgoing text message, the display manager being configured to display the execution status indicator in the synthesis window in addition to the operating information of the aircraft, the incoming text messages including instructions or authorizations from the outside assembly, the outgoing messages including requests and/or confirmations for evolution operations of the aircraft, the action to be performed including an action to be taken by a crew on the aircraft with respect to the evolution operations.

2. The communication system as recited in claim 1 wherein the receiver/sender includes a processor configured to process incoming text messages, configured to extract, from an incoming text message, the action to be performed associated with the incoming text message, and a status determiner for determining the execution status of the action to be performed associated with the incoming text message.

3. The communication system as recited in claim 1 wherein the display manager is configured to display, at the synthesis window, a secondary window specifying the or each action to be performed.

4. The communication system as recited in claim 3 wherein the secondary window has a button to close the secondary window, allowing a return to the synthesis window.

5. The communication system as recited in claim 1 wherein the action to be performed includes sending, to the outside assembly, an execution report for an operation associated with the message.

6. The communication system as recited in claim 5 wherein the action to be performed is chosen from among the manual sending to the outside assembly of an execution report for the operation associated with the message, or the automatic sending to the outside assembly of an execution report for the operation associated with the message.

7. The communication system as recited in claim 1 wherein the execution status is chosen from among pending the manual sending of an execution report, pending the automatic sending of an execution report, pending the action to be performed, or expiration of the action to be performed after a predefined time delay.

8. The communication system as recited in claim 1 wherein the execution status indicator includes text displayed in the incoming message and/or the outgoing message.

9. The communication system as recited in claim 1 wherein the display manager is configured to display an auxiliary indicator, situated near the performance status indicator, specifying the incoming or outgoing nature of the action to be performed.

10. The communication system as recited in claim 1 wherein the display manager is configured to display the execution status indicator with distinct marking of the operation information of the text message.

11. A communication method for an aircraft to communicate with an outside assembly, comprising the following steps:
providing the communication system as recited in claim 1;
using the display manager to display, on the display screen, a synthesis window showing a series of incoming text messages and/or outgoing text messages, each of the incoming text messages and/or outgoing text messages containing operating information of the aircraft,
displaying, in the synthesis window, for at least one of the incoming text messages and/or the outgoing text messages displayed in the synthesis window, an execution status indicator for an action to be performed remaining to be executed, associated with the at least one of the incoming text messages and/or the outgoing text messages, in addition to the operating information of the aircraft.

12. The communication system as recited in claim 1 wherein the air traffic control center is a control tower of an airport or an aircraft carrier.

13. The method as recited in claim 11 further comprising:
displaying, in the synthesis window, one of the outgoing text messages sent by the aircraft to the outside assembly, the displayed outgoing message being related to a request from the aircraft to the outside assembly to perform an operation;
displaying one of the incoming text messages received by the aircraft in response to the request from the aircraft, the displayed incoming text message being associated with at least one action to be performed associated with the operation;
displaying, in the synthesis window, an execution status indicator for the action to be performed remaining to be executed associated with the displayed incoming text message.

14. The method as recited in claim 13 wherein the displayed outgoing text message relates to a request to change the evolution of the aircraft, the displayed incoming message including an authorization to make the evolution change.

15. The method as recited in claim 11 wherein the action to be performed includes sending to the outside assembly an execution report, the method including manual or automatic sending of the execution report from the aircraft to the outside assembly when the action to be performed is completed and deactivating the display of the execution status indicator in the synthesis window after the execution report has been sent.

16. The method as recited in claim 11 further comprising opening a secondary window on the display screen outlining the or each action to be performed associated with the at least one of the incoming text message and/or the outgoing text message, then closing the secondary window to return to the synthesis window, the execution status indicator being displayed in the synthesis window.

17. The method as recited in claim 11 further comprising receiving the at least one incoming text message by an incoming text message receiver and processing the at least one incoming text message to extract at least one action to be performed therefrom associated with the at least one incoming text message, the method including determining the execution status of the action to be performed by a status determiner of the receiver.

18. A communication system for an aircraft to communicate with an outside assembly comprising:
a receiver/sender configured to receive incoming text messages, received from the outside assembly, and to send outgoing text messages, sent to the outside assembly, the outside assembly being an air traffic control center or an approach control center;
a display screen and a display manager, the display manager configured to display, on the display screen, a synthesis window showing a series of incoming text messages and/or outgoing text messages, each text message containing operating information about the aircraft,
the display manager being configured to display, in the synthesis window, for at least one incoming text message and/or outgoing text message displayed in the synthesis window, an execution status indicator for an action to be performed remaining to be executed, associated with the incoming text message and/or the outgoing text message, in addition to the operating information of the aircraft,
wherein the receiver/sender includes a processor configured to process incoming text messages, configured to extract, from an incoming text message, the action to be performed associated with the incoming text message, and a status determiner for determining the execution status of the action to be performed associated with the incoming text message, the incoming text messages including instructions or authorizations from the outside assembly, the outgoing messages including requests and/or confirmations for evolution operations of the aircraft, the action to be performed including an action to be taken by a crew on the aircraft with respect to the evolution operations.

19. A communication system for an aircraft to communicate with an outside assembly comprising:
a receiver/sender configured to receive incoming text messages, received from the outside assembly, and to send outgoing text messages, sent to the outside assembly, the outside assembly being an air traffic control center or an approach control center;
a display screen and a display manager, the display manager configured to display, on the display screen, a synthesis window showing a series of incoming text messages and/or outgoing text messages, each text message containing operating information about the aircraft,
the display manager being configured to display, in the synthesis window, for at least one incoming text message and/or outgoing text message displayed in the synthesis window, an execution status indicator for an action to be performed remaining to be executed, associated with the incoming text message and/or the outgoing text message, in addition to the operating information of the aircraft, wherein the display manager is configured to display, at the synthesis window, a secondary window specifying the or each action to be performed, wherein the secondary window has a button to close the secondary window, allowing a return to the synthesis window, the incoming text messages including instructions or authorizations from the outside assembly, the outgoing messages including requests and/or confirmations for evolution operations of the aircraft, the action to be performed including an action to be taken by a crew on the aircraft with respect to the evolution operations.

* * * * *